(12) United States Patent
Affer et al.

(10) Patent No.: US 6,390,760 B1
(45) Date of Patent: May 21, 2002

(54) SPARE TIRE SECURITY SYSTEM

(76) Inventors: Michael Affer, 22414 Edgewood, St. Clair Shores, MI (US) 48080; Anthony E. Backus, 4134 Lincoln, Dearborn Heights, MI (US) 48125; Richard F. Boris, 28 McKinley Pl., Grosse Pointe, MI (US) 48236

( * ) Notice: Subject to any disclaimer, the term of this patent is extended or adjusted under 35 U.S.C. 154(b) by 0 days.

(21) Appl. No.: 09/658,750

(22) Filed: Sep. 8, 2000

(51) Int. Cl.[7] ............................................. B62D 43/06
(52) U.S. Cl. ...................................... 414/463; 254/323
(58) Field of Search ........................ 254/323; 414/463, 414/464, 465, 466

(56) References Cited

U.S. PATENT DOCUMENTS

| | | |
|---|---|---|
| 3,688,954 A | 9/1972 | Neal |
| 4,600,352 A * | 7/1986 | Ivan ....................... 254/323 X |
| 4,613,273 A | 9/1986 | Wagner |
| 4,625,947 A * | 12/1986 | Denman et al. ........ 414/463 X |
| 4,768,361 A | 9/1988 | Derman |
| 5,343,722 A | 9/1994 | Richardson |
| D377,470 S | 1/1997 | Santangelo |
| 5,791,859 A | 8/1998 | Simnacher |
| 6,092,790 A * | 7/2000 | Dobmeier et al. ........... 254/323 |
| 6,132,162 A * | 10/2000 | Kito et al. .............. 254/323 X |

* cited by examiner

*Primary Examiner*—Janice L. Krizek

(57) ABSTRACT

A spare tire security system for preventing access of the winch assembly outside the vehicle. The spare tire security system includes a vehicle having a passenger compartment, a rear wall forming a portion of the passenger compartment, and also having an undercarriage; and also includes a winch assembly being securely mounted beneath the undercarriage of the vehicle and having a housing, a spool rotatably mounted in the housing, a first gear member mounted to the spool, a winch drive shaft journaled through a wall of the housing and extending through the hole in the rear wall, and a second gear member being mounted to the winch drive shaft and being engaged to the first gear member; and further includes a tubular member being securely attached to the undercarriage for carrying the cable; and also includes a crank assembly being attached to the winch drive shaft and being adapted to lower and raise a spare tire disposed beneath the undercarriage.

18 Claims, 4 Drawing Sheets

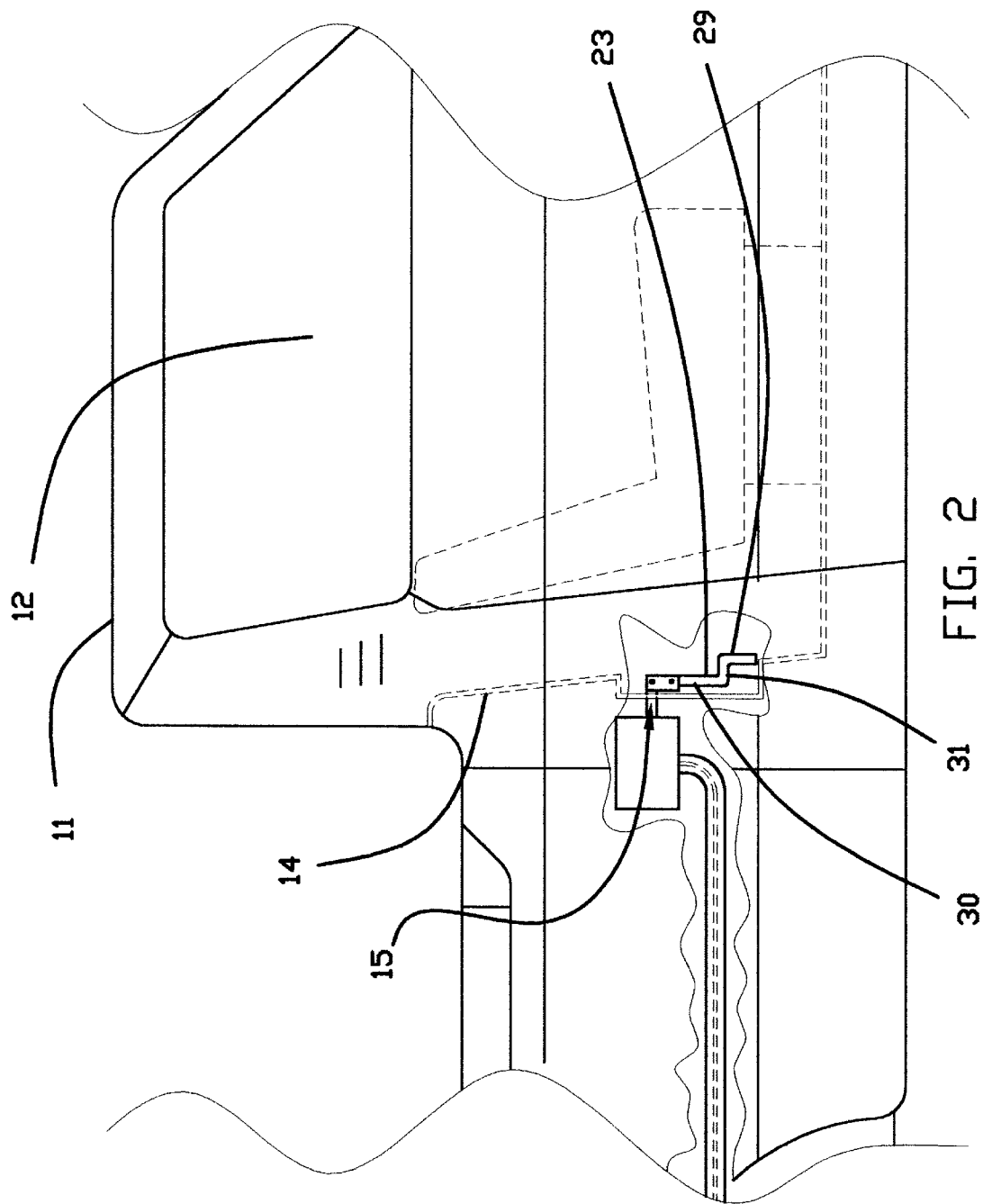

SPARE TIRE SECURITY SYSTEM

BACKGROUND OF THE INVENTION

1. Field of the Invention

The present invention relates to an anti-theft spare tire system and more particularly pertains to a new spare tire security system for preventing access of the winch assembly outside the vehicle.

2. Description of the Prior Art

The use of an anti-theft spare tire system is known in the prior art. More specifically, an anti-theft spare tire system heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,613,273; U.S. Pat. No. 4,768,361; U.S. Pat. No. 5,343,722; U.S. Pat. No. 3,688,954; U.S. Pat. No. 5,791,859; and U.S. Pat. No. Des. 377,470.

While these devices fulfill their respective, particular objectives and requirements, the aforementioned patents do not disclose a new spare tire security system. The inventive device includes a vehicle having a passenger compartment, a rear wall forming a portion of the passenger compartment, and also having an undercarriage; and also includes a winch assembly being securely mounted beneath the undercarriage of the vehicle and having a housing, a spool rotatably mounted in the housing, a first gear member mounted to the spool, a winch drive shaft journaled through a wall of the housing and extending through the hole in the rear wall, and a second gear member being mounted to the winch drive shaft and being engaged to the first gear member; and further includes a tubular member being securely attached to the undercarriage for carrying the cable; and also includes a crank assembly being attached to the winch drive shaft and being adapted to lower and raise a spare tire disposed beneath the undercarriage.

In these respects, the spare tire security system according to the present invention substantially departs from the conventional concepts and designs of the prior art, and in so doing provides an apparatus primarily developed for the purpose of preventing access of the winch assembly outside the vehicle.

SUMMARY OF THE INVENTION

In view of the foregoing disadvantages inherent in the known types of anti-theft spare tire system now present in the prior art, the present invention provides a new spare tire security system construction wherein the same can be utilized for preventing access of the winch assembly outside the vehicle.

The general purpose of the present invention, which will be described subsequently in greater detail, is to provide a new spare tire security system which has many of the advantages of the anti-theft spare tire system mentioned heretofore and many novel features that result in a new spare tire security system which is not anticipated, rendered obvious, suggested, or even implied by any of the prior art anti-theft spare tire system, either alone or in any combination thereof.

To attain this, the present invention generally comprises a vehicle having a passenger compartment, a rear wall forming a portion of the passenger compartment, and also having an undercarriage; and also includes a winch assembly being securely mounted beneath the undercarriage of the vehicle and having a housing, a spool rotatably mounted in the housing, a first gear member mounted to the spool, a winch drive shaft journaled through a wall of the housing and extending through the hole in the rear wall, and a second gear member being mounted to the winch drive shaft and being engaged to the first gear member; and further includes a tubular member being securely attached to the undercarriage for carrying the cable; and also includes a crank assembly being attached to the winch drive shaft and being adapted to lower and raise a spare tire disposed beneath the undercarriage.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new spare tire security system which has many of the advantages of the anti-theft spare tire system mentioned heretofore and many novel features that result in a new spare tire security system which is not anticipated, rendered obvious, suggested, or even implied by any of the prior art anti-theft spare tire system, either alone or in any combination thereof.

It is another object of the present invention to provide a new spare tire security system which may be easily and efficiently manufactured and marketed.

It is a further object of the present invention to provide a new spare tire security system which is of a durable and reliable construction.

An even further object of the present invention is to provide a new spare tire security system which is susceptible of a low cost of manufacture with regard to both materials and labor, and which accordingly is then susceptible of low prices of sale to the consuming public, thereby making such spare tire security system economically available to the buying public.

Still yet another object of the present invention is to provide a new spare tire security system which provides in the apparatuses and methods of the prior art some of the advantages thereof, while simultaneously overcoming some of the disadvantages normally associated therewith.

Still another object of the present invention is to provide a new spare tire security system for preventing access of the winch assembly outside the vehicle.

Yet another object of the present invention is to provide a new spare tire security system which includes a vehicle having a passenger compartment, a rear wall forming a portion of the passenger compartment, and also having an undercarriage; and also includes a winch assembly being securely mounted beneath the undercarriage of the vehicle and having a housing, a spool rotatably mounted in the housing, a first gear member mounted to the spool, a winch drive shaft journaled through a wall of the housing and extending through the hole in the rear wall, and a second gear member being mounted to the winch drive shaft and being engaged to the first gear member; and further includes a tubular member being securely attached to the undercarriage for carrying the cable; and also includes a crank assembly being attached to the winch drive shaft and being adapted to lower and raise a spare tire disposed beneath the undercarriage.

Still yet another object of the present invention is to provide a new spare tire security system that prevents a person from gaining access to the spare tire from outside the passenger compartment of the vehicle.

Even still another object of the present invention is to provide a new spare tire security system that is a safety feature for women driving alone or women with children.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a perspective view of passenger compartment and rear wall of the vehicle of the present invention.

DESCRIPTION OF THE PREFERRED EMBODIMENT

Figure 1:
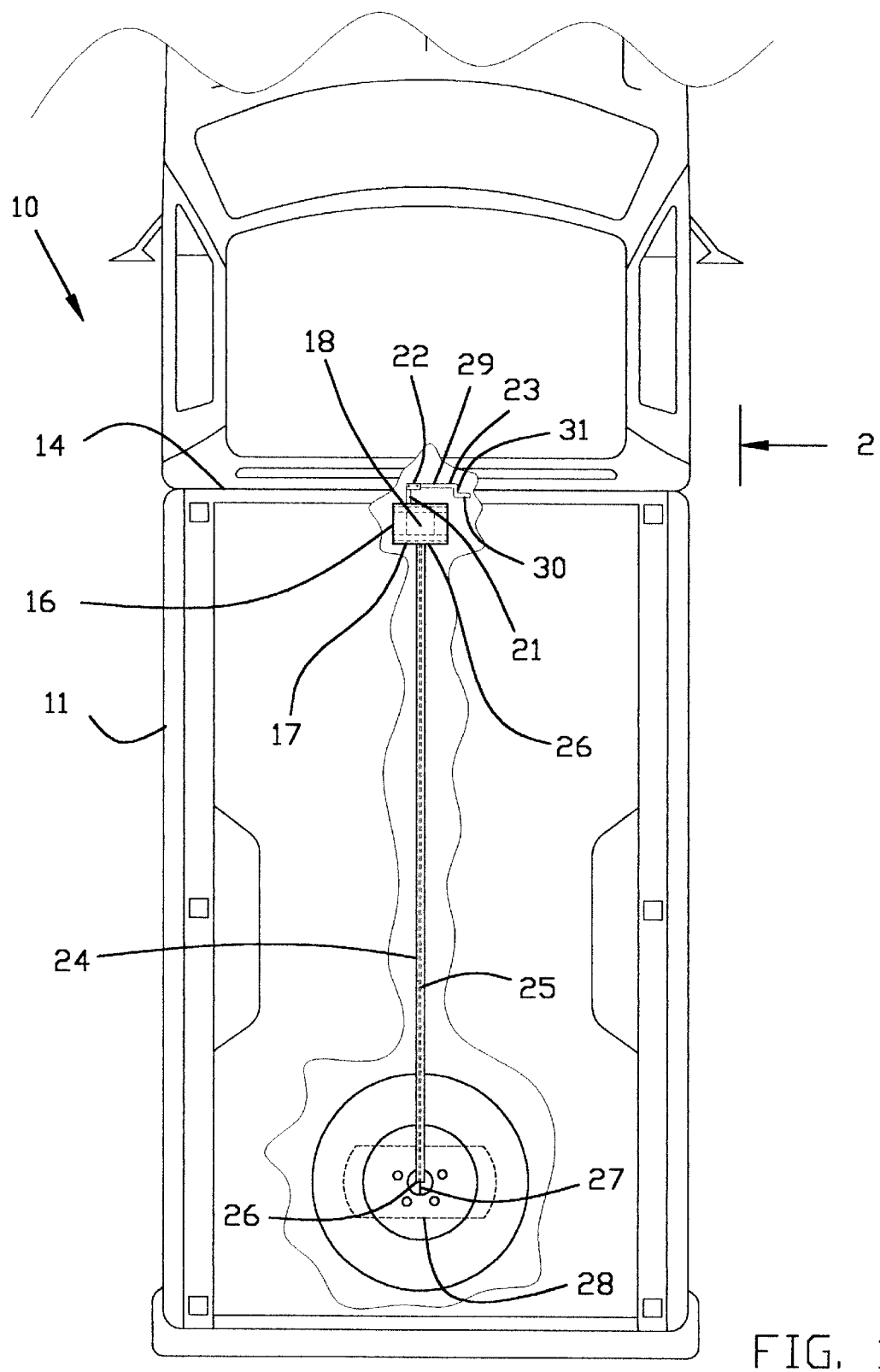
FIG. 1 is a bottom plan view of a new spare tire security system according to the present invention.
Figure 5:
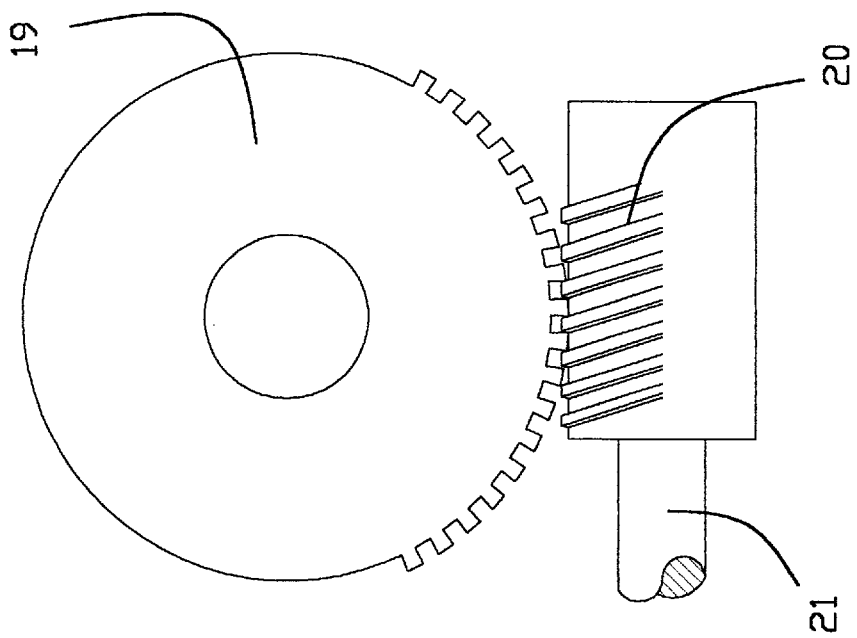
FIG. 5 is a side elevational view of the first and second gear members and winch drive shaft of the present invention.
Figure 3:
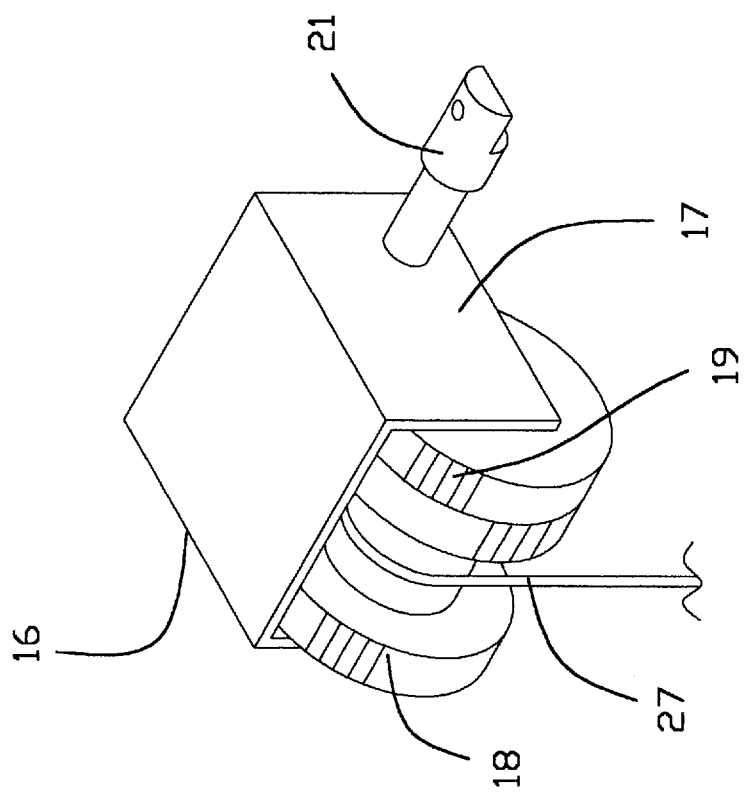
FIG. 3 is a perspective view of the winch assembly of the present invention.
Figure 4:
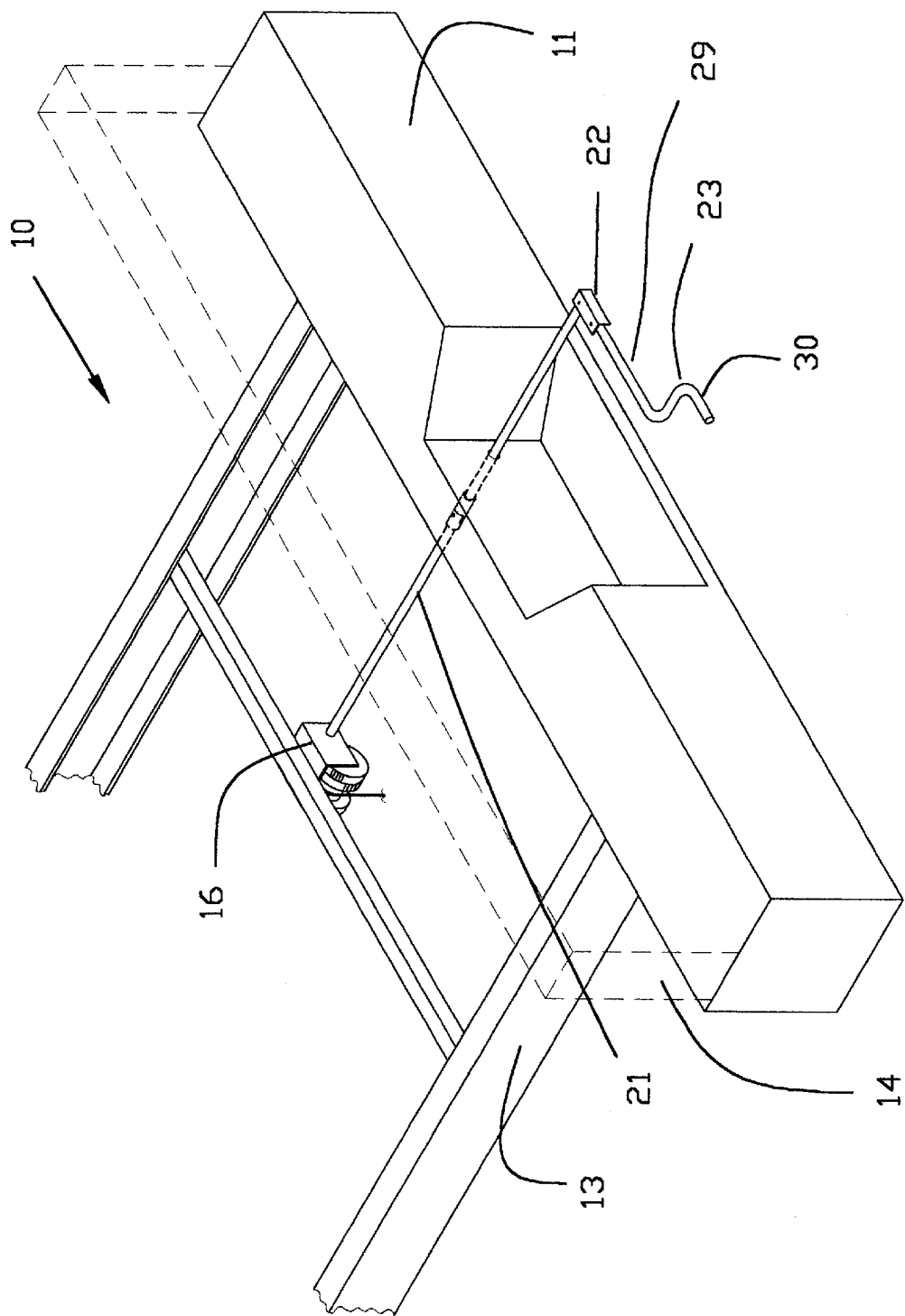
FIG. 4 is a perspective view of the winch assembly and the tubular member and the crank assembly of the present invention.

With reference now to the drawings, and in particular to FIGS. 1 through 5 thereof, a new spare tire security system embodying the principles and concepts of the present invention and generally designated by the reference numeral 10 will be described.

As best illustrated in FIGS. 1 through 5, the spare tire security system 10 generally comprises a vehicle 11 having a passenger compartment 12, a rear wall 14 forming a portion of the passenger compartment 12, and also having an undercarriage 13. The rear wall 14 of the vehicle 11 includes a hole 15 disposed therethrough. A winch assembly 16 is securely and conventionally mounted beneath the undercarriage 13 of the vehicle 11 and has a housing 17, a spool 18 rotatably and conventionally mounted in the housing 17, a first gear member 19 conventionally mounted to the spool 18, a winch drive shaft 21 journaled through a wall of the housing 17 and extending through the hole 15 in the rear wall 14, and a second gear member 20 being conventionally mounted to the winch drive shaft 21 and being engaged to the first gear member 19. The winch drive shaft 21 extends into the passenger compartment 12 through the hole 15 in the rear wall 14. A tubular member 24 is securely and conventionally attached to the undercarriage 13 for carrying the cable 27 with the tubular member 24 extending from the winch assembly 16 to a spare tire support assembly 28. The tubular member 24 has open ends 26 and a bore 25 extending therethrough and is adapted to receive the cable 27 therethrough. A crank assembly is attached to the winch drive shaft 21 and is adapted to lower and raise a spare tire disposed beneath the undercarriage 13. The crank assembly includes a bracket member 22 being securely and conventionally attached to an end of the winch drive shaft 21 disposed in the passenger compartment 12 of the vehicle 11, and also includes a crank member 23 being hingedly and conventionally attached to the bracket member 22. The crank member 23 is adapted to rest against the rear wall 14 inside the passenger compartment 12 with the crank member 23 including a handle portion 30, an intermediate portion 31 which is angled relative to the handle portion 30, and an end portion 29 which is angled relative to the intermediate portion 31 and which is hingedly attached to the winch drive shaft 21.

In use, the user can only access the spare tire beneath the vehicle 11 by using the crank member 23 located inside the passenger compartment 12 of the vehicle 11 and can easily raise and lower the spare tire by turning the crank member 23 which actuates the winch assembly 16.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A spare tire security system for a vehicle comprising:
a vehicle having a passenger compartment, a rear wall forming a portion of said passenger compartment, and also having an undercarriage;
a winch assembly being securely mounted on said vehicle and having a housing, a spool rotatably mounted in said housing, said spool having a cable wrapped thereabout, a first gear member mounted to said spool, a winch drive shaft journaled through a wall of said housing and a second gear member being mounted to said winch drive shaft and being engaged to said first gear member;
a tubular member being securely attached to said undercarriage for carrying said cable;
a crank assembly being attached to said winch drive shaft and being adapted to lower and raise a spare tire disposed beneath said undercarriage, said crank assembly including a crank member being rotatable with said winch drive shaft to permit rotation of said winch drive shaft by rotating said crank member, said crank member being positioned adjacent to the rear wall of said vehicle;
wherein said rear wall of said vehicle includes a hole disposed therethrough, said winch drive shaft extending into said passenger compartment through said hole in said rear wall, said winch drive shaft being oriented along and being rotatable about a substantially horizontal axis, said crank member being rotatable in a plane oriented substantially parallel to the rear wall of said vehicle.

2. A spare tire security system for a vehicle as described in claim 1, wherein said tubular member extends from said winch assembly to a spare tire support assembly, said tubular member having open ends and a bore extending therethrough and being adapted to receive said cable therethrough.

3. A spare tire security system for a vehicle as described in claim 1, wherein said crank assembly includes a bracket member being pivotally attached to an end of said winch drive shaft disposed in said passenger compartment of said vehicle, said bracket member being pivotally attached to said crank member.

4. A spare tire security system for a vehicle as described in claim 1, wherein said crank member is adapted to rest against said rear wall inside said passenger compartment.

5. A spare tire security system for a vehicle as described in claim 1, wherein said crank member includes a handle portion, an intermediate portion which is angled relative to said handle portion, and an end portion which is angled relative to said intermediate portion, said intermediate portion being hingedly attached to said winch drive shaft.

6. A spare tire security system for a vehicle as described in claim 1, wherein said crank member is pivotably connected to said winch drive shaft to permit folding of said crank member into a closely adjacent relationship with said rear wall of said vehicle.

7. A spare tire security system for a vehicle as described in claim 1, wherein said rear wall of said vehicle has a recess formed in a forward surface thereof toward said passenger compartment, said recess being sunken into said rear wall, said crank member being pivotably positionable in said recess during times of non-use of said crank member.

8. A spare tire security system for a vehicle as described in claim 7, wherein said crank member does not protrude out of said recess beyond a plane of said rear wall of said vehicle.

9. A spare tire security system for a vehicle comprising:
a vehicle having a passenger compartment, a rear wall forming a portion of said passenger compartment, and also having an undercarriage;
a winch assembly being mounted on said vehicle and having a housing, a spool rotatably mounted on said housing, a cable with a portion thereof wrapped about said spool, a winch drive shaft operationally connected to said spool,
a tubular guide being mounted on said undercarriage for carrying said cable; and
a crank assembly being attached to said winch drive shaft and being adapted to lower and raise a spare tire disposed beneath said undercarriage, said crank assembly including a crank member being rotatable with said winch drive shaft to permit rotation of said winch drive shaft by rotating said crank member, said crank member being positioned adjacent to the rear wall of said vehicle;
wherein said winch drive shaft extends into said passenger compartment, said winch drive shaft being oriented along and being rotatable about a substantially horizontal axis, said crank member being rotatable in a plane oriented substantially parallel to the rear wall of said vehicle.

10. A spare tire security system for a vehicle as described in claim 9, wherein said rear wall of said vehicle includes a hole disposed therethrough, said winch drive shaft extending through said hole.

11. A spare tire security system for a vehicle as described in claim 9, wherein said tubular member extends from said winch assembly to a spare tire support assembly, said tubular member having open ends and a bore extending therethrough and being adapted to receive said cable therethrough.

12. A spare tire security system for a vehicle as described in claim 9, wherein said crank assembly includes a bracket member being pivotally attached to an end of said winch drive shaft disposed in said passenger compartment of said vehicle, said bracket member being pivotally attached to said crank member.

13. A spare tire security system for a vehicle as described in claim 9, wherein said crank member is adapted to rest against said rear wall inside said passenger compartment.

14. A spare tire security system for a vehicle as described in claim 9, wherein said crank member includes a handle portion, an intermediate portion which is angled relative to said handle portion, and an end portion which is angled relative to said intermediate portion, said intermediate portion being hingedly attached to said winch drive shaft.

15. A spare tire security system for a vehicle as described in claim 9, wherein said crank member is pivotably connected to said winch drive shaft to permit folding of said crank member into a closely adjacent relationship with said rear wall of said vehicle.

16. A spare tire security system for a vehicle as described in claim 9, wherein said rear wall of said vehicle has a recess formed in a forward surface thereof toward said passenger compartment, said recess being sunken into said rear wall, said crank member being pivotably positionable in said recess during times of non-use of said crank member.

17. A spare tire security system for a vehicle as described in claim 16, wherein said crank member does not protrude out of said recess beyond a plane of said rear wall of said vehicle.

18. A spare tire security system for a vehicle comprising:

a vehicle having a passenger compartment, a rear wall forming a portion of said passenger compartment, and also having an undercarriage;

a winch assembly being securely mounted on said vehicle and having a housing, a spool rotatably mounted in said housing, said spool having a cable wrapped thereabout, a first gear member mounted to said spool, a winch drive shaft journaled through a wall of said housing, and a second gear member being mounted to said winch drive shaft and being engaged to said first gear member;

a tubular member being securely attached to said undercarriage for carrying said cable;

a crank assembly being attached to said winch drive shaft and being adapted to lower and raise a spare tire disposed beneath said undercarriage, said crank assembly including a crank member being rotatable with said winch drive shaft to permit rotation of said winch drive shaft by rotating said crank member, said crank member being positioned adjacent to the rear wall of said vehicle;

wherein said rear wall of said vehicle includes a hole disposed therethrough, said winch drive shaft extending into said passenger compartment through said hole in said rear wall, said winch drive shaft being oriented along and being rotatable about a substantially horizontal axis, said crank member being rotatable in a plane oriented substantially parallel to the rear wall of said vehicle;

wherein said tubular member extends from said winch assembly to a spare tire support assembly, said tubular member having open ends and a bore extending therethrough and being adapted to receive said cable therethrough;

wherein said crank assembly includes a bracket member being pivotally attached to an end of said winch drive shaft disposed in said passenger compartment of said vehicle, said bracket member being pivotally attached to said crank member;

wherein said crank member is adapted to rest against said rear wall inside said passenger compartment;

wherein said crank member includes a handle portion, an intermediate portion which is angled relative to said handle portion, and an end portion which is angled relative to said intermediate portion, said intermediate portion being hingedly attached to said winch drive shaft;

wherein said crank member is pivotably connected to said winch drive shaft in a manner permitting folding of said crank member into a closely adjacent relationship with said rear wall of said vehicle;

wherein said rear wall of said vehicle has a recess formed in a forward surface thereof toward said passenger compartment, said recess being sunken into said rear wall, said crank member being pivotably positionable in said recess during times of non-use of said crank member; and wherein said crank member does not protrude out of said recess beyond a plane of said rear wall of said vehicle.

* * * * *